United States Patent
Lee et al.

(10) Patent No.: US 10,185,185 B2
(45) Date of Patent: Jan. 22, 2019

(54) DISPLAY PANEL

(71) Applicant: Innolux Corporation, Miao-Li County (TW)

(72) Inventors: Yi-Chin Lee, Miao-Li County (TW); Yu-Lun Hsu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/835,863

(22) Filed: Dec. 8, 2017

(65) Prior Publication Data

US 2018/0101042 A1    Apr. 12, 2018

Related U.S. Application Data (63) Continuation of application No. 14/707,149, filed on May 8, 2015, now Pat. No. 9,869,905.

(30) Foreign Application Priority Data

Jun. 10, 2014  (TW) .............................. 103120001 A (51) Int. Cl.
*G02F 1/1339* (2006.01)
*G02F 1/1335* (2006.01)

(52) U.S. Cl.
CPC .... *G02F 1/13394* (2013.01); *G02F 1/133512* (2013.01); *G02F 2001/13396* (2013.01)

(58) Field of Classification Search
CPC ................................................ G02F 1/134363
See application file for complete search history.

(56) References Cited

U.S. PATENT DOCUMENTS

| 9,176,339 B2 | 11/2015 | Kim et al. |
| 2004/0169797 A1 | 9/2004 | Fujita et al. |
| 2012/0019748 A1 | 1/2012 | Kim et al. |

(Continued)

FOREIGN PATENT DOCUMENTS

| CN | 1523408 A | 8/2004 |
| CN | 102346339 A | 2/2012 |

OTHER PUBLICATIONS

CN Office Action dated Nov. 17, 2017 in Chinese application (No. 201410256395.1).

*Primary Examiner* — James Dudek
(74) *Attorney, Agent, or Firm* — McClure, Qualey & Rodack, LLP (57) ABSTRACT

A display panel includes a first substrate, a second substrate and a light shielding layer located between the first substrate and the second substrate. The light shielding layer includes first connecting portions extending along a first direction, second connecting portions extending along a second direction, extending portions and sub-extending portions connected by the first and second connecting portions. The first connecting portions and the second connecting portions define sub-pixels. The sub-pixels include a first sub-pixel. A projection of the extending portions on the first substrate overlaps the first sub-pixel to form a first overlapping area. A projection of the sub-extending portions on the first substrate overlaps the first sub-pixel to form a second overlapping area. The first overlapping area is greater than the second overlapping area. A largest width of the extending portions is greater than a largest width of the sub-extending portions in the first direction.

17 Claims, 9 Drawing Sheets

(56) References Cited

U.S. PATENT DOCUMENTS

2012/0268699 A1 10/2012 Min et al.
2015/0185566 A1* 7/2015 Choi ................. G02F 1/134336
              349/42
2015/0241726 A1 8/2015 Nakamura
2015/0261050 A1 9/2015 Chen et al.

* cited by examiner

DISPLAY PANEL

This is a continuation of application Ser. No. 14/707,149, filed on May 8, 2015 (now allowed) and entitled "DISPLAY PANEL", now U.S. Pat. No. 9,869,905, which claims the benefit of Taiwan patent application serial number 103120001, filed on Jun. 10, 2014, the contents of which are incorporated herein by reference.

BACKGROUND OF THE INVENTION

Field of the Invention

The invention relates in general to a display panel, and more particularly to a flat display panel.

Description of the Related Art

The generally known display panel comprises a plurality of pixels. The display panel displays an image by mixing the colors and brightness of the pixels. Adjacent pixels are separate by a light shielding layer which increases the contrast between pixels and shields signal traces.

Normally, the light shielding layer is not one-sized. In some regions of the display panel, the light shielding layer is enlarged to shield parts of the structure such as spacers. The enlarged light shielding layer shields the display region of adjacent pixels, hence decreasing the aperture ratio (AR) of adjacent pixels. That is, the pixels of the display panel at least have two aperture ratios. However, when the pixels with lower aperture ratio are arranged in a repetitive manner, the image may look having strips to the viewer's naked eyes, the display quality and visual quality of the panel will be affected.

SUMMARY OF THE INVENTION

The invention is directed to a display panel capable of improving visual quality without increasing the aperture ratio through special pattern design of the light shielding layer.

According to one embodiment of the present invention, a display panel is provided. The display panel comprises a first substrate, a second substrate and a light shielding layer. The first substrate comprises a plurality of display units arranged in a matrix and forming an image display region. The display unit comprise m*n pixels arranged in an m*n matrix, wherein m and n are positive integers m≥6, and n≥2. The second substrate is opposite to the first substrate. The light shielding layer is located between the first substrate and the second substrate. The light shielding layer comprises a plurality of extending portions. A projection of one of the extending portions on the first substrate overlaps at least two of the pixels. One of the two pixels having larger overlapping area with the extending portions is a first pixel, and the other one is a second pixel. In each display unit, there is at most one first pixel per column and per row, and in the image display region, all of the pixels adjacent to the first pixel are second pixels.

According to another embodiment of the present invention, a display panel is provided. The display panel comprises a first substrate, a second substrate and a light shielding layer. The first substrate comprises a plurality of display units arranged in a matrix and forming an image display region. The display units comprise m*n pixels arranged in an m*n matrix. Each pixel has at least three sub-pixels, wherein m and n are positive integers, m≥2, and n≥2. The second substrate is opposite to the first substrate. The light shielding layer is located between the first substrate and the second substrate. The light shielding layer comprises a plurality of extending portions. A projection of one of the extending portions on the first substrate overlaps at least one of the pixels. The pixel overlapping the projection of the extending portion is a first pixel. Other pixels not overlapping the projection of the extending portion are second pixels. In each display unit, there is at most one first pixel per column and per row, and in the image display region, all of the pixels adjacent to the first pixel are second pixels.

The above and other aspects of the invention will become better understood with regard to the following detailed description of the preferred but non-limiting embodiment (s). The following description is made with reference to the accompanying drawings.

DETAILED DESCRIPTION OF THE INVENTION

A number of embodiments are disclosed below with accompanying drawings for elaborating the invention. It should be noted that the drawings are simplified so as to provide clear descriptions of the embodiments of the invention, and the scales used in the drawings are not based on the scales of actual products. However, the embodiments of the invention are for detailed descriptions only, not for limiting the scope of protection of the invention.

Figure 1:
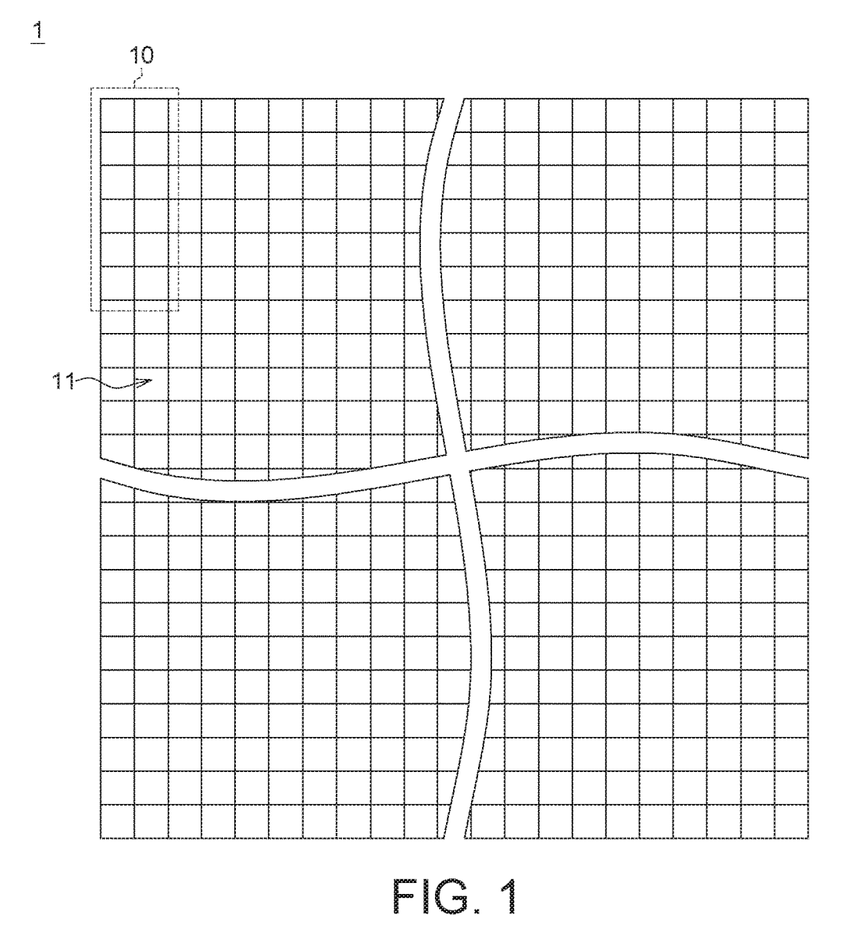
FIG. 1 is a planar diagram of a display panel according to an embodiment of the invention.
Figure 2A:
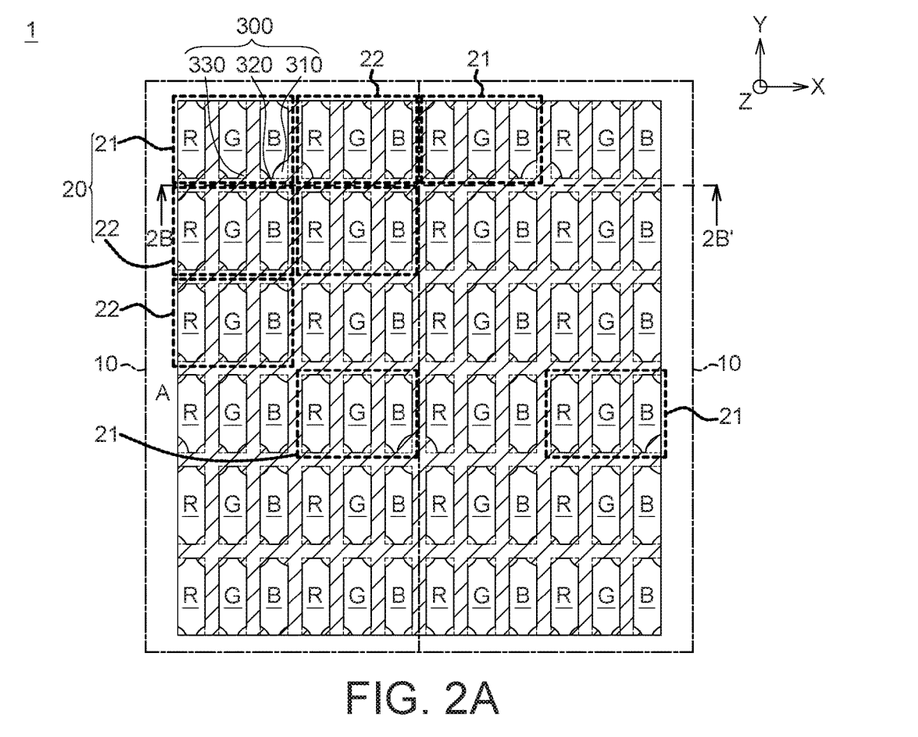
FIG. 2A is a partial enlarged diagram of the display panel of FIG. 1.
Figure 2B:
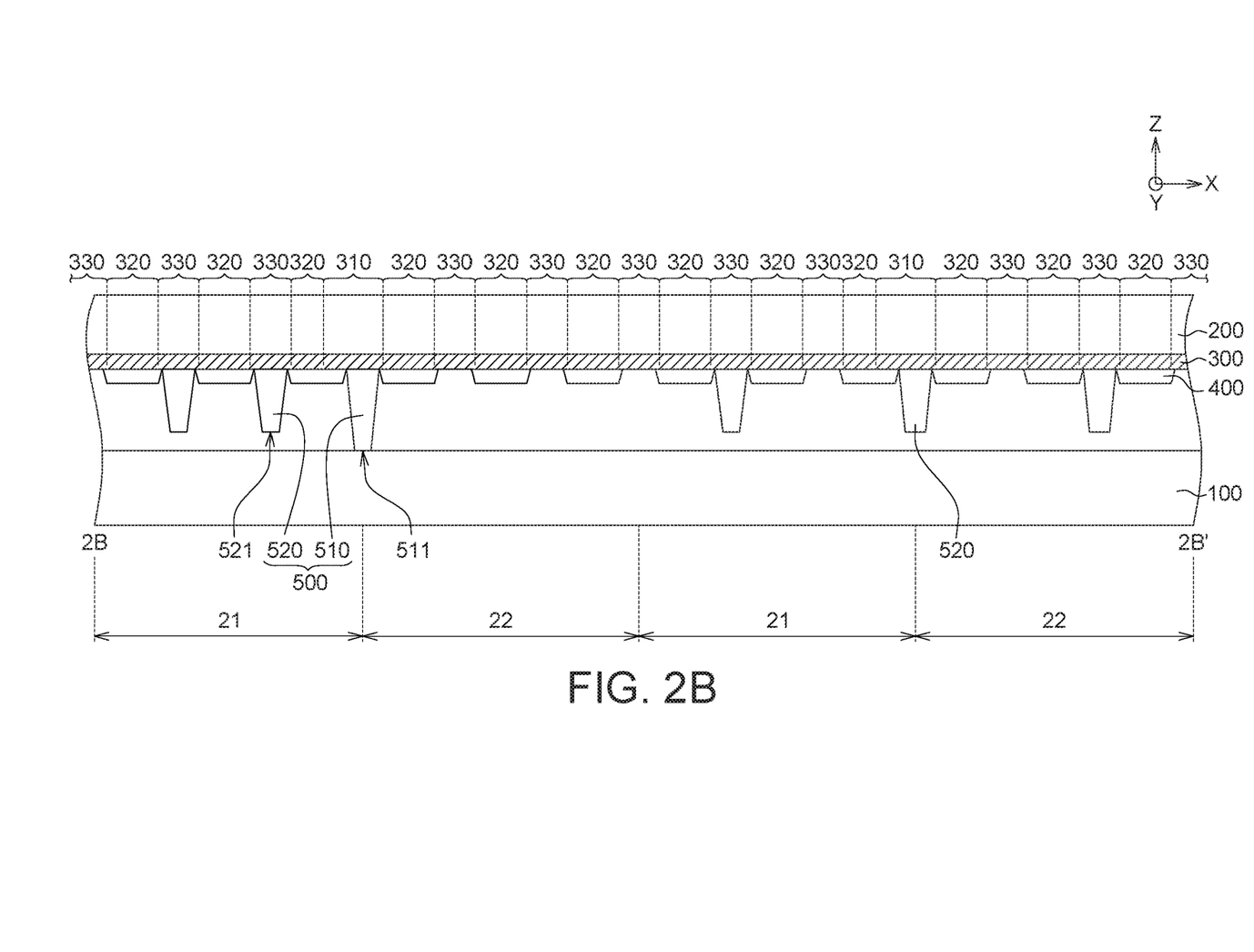
FIG. 2B is a cross-sectional diagram of the display panel of FIG. 2A.

Refer to FIG. 1 to FIG. 2B. FIG. 1 is a planar diagram of a display panel according to an embodiment of the invention. FIG. 2A is a partial enlarged diagram of two side-by-side display units 10 of the display panel of FIG. 1. FIG. 2B is a cross-sectional diagram of the display panel of FIG. 2A viewed along a cross-sectional line 2B-2B'. The display panel 1 comprises a first substrate 100, a second substrate 200 and a light shielding layer 300. The first substrate 100 comprises a plurality of identical display units 10 arranged in a matrix and forming an image display region 11.

As indicated in FIG. 2A and FIG. 2B, the display unit 10 comprises m*n pixels 20 arranged in an m*n matrix, wherein m and n are positive integers m≥2, and m≥2, and each pixel 20 is composed of at least three sub-pixels corresponding to different colors. The second substrate 200 is opposite to the first substrate 100. The light shielding layer 300 is located between the first substrate 100 and the second substrate 200 and disposed on one of the first substrate 100 and the second substrate 200. In the present embodiment, the light shielding layer 300 is realized by a black matrix (BM)

and disposed on the second substrate 200. The light shielding layer 300 comprises a plurality of extending portions 310. The projection of each extending portion 310 on the first substrate 100 overlaps at least one pixel 20 (each extending portion 310 overlaps four pixels 20 as indicated in FIG. 2A). In the present invention, the pixel 20 having the largest overlapping area with the extending portion 310 is defined as a first pixel 21, and other pixels 20 with smaller overlapping area with the extending portion 310 or not overlapping the extending portion 310 are defined as second pixels 22. In each display unit 10, there is at most one first pixel 21 per column and per row. In the entire image display region, all pixels adjacent to the first pixel 21 are second pixels 22.

In the display panel 1 of the embodiment of the present invention, by adjusting the position of each extending portion 310 of the light shielding layer 300, the first pixels 21 with lower aperture ratio overlapped by the extending portion 310 can be distributed over the entire image display region and occupy a certain percentage. Since the first pixels 21 are not easily detected by naked eyes, the viewer will not perceive image strips, and display quality can thus be improved.

FIG. 2A illustrates two display units 10 for exemplary purpose. Each display unit 10 comprises 12 pixels arranged in a 6*2 matrix 20 (6 rows, 2 columns). It should be noted that each pixels 20 comprises three sub-pixels respectively designated by the three primary colors red (R), green (G), and blue (B). The light shielding layer 300 is disposed at the interval between any adjacent two of the sub-pixels R, G and B, and extends along the X-axis direction and the Y-axis direction to form a grid shape. The light shielding layer 300 covers the trace and divides the display unit 10 into different color blocks. In the present embodiment, each extending portion 310 of the light shielding layer 300 is disposed at the junction between the four pixels 20, such that the projection of the each extending portion 310 on the first substrate 100 partially overlaps the four pixels 20. The overlapping area between the pixels 20 and each extending portion 310 does not display colors, hence affecting the aperture ratio of the pixels 20. The projection of the extending portion 310 overlaps the four pixels 20 by different overlapping areas. The one of the four pixels 20 having the largest overlapping area with the extending portion 310 is defined as a first pixel 21, and the other three pixels 20 with smaller overlapping areas with the extending portion 310 are defined as second pixels 22, In the present invention, each pixel 20 not overlapping with any extending portions 310 is defined as a second pixel 22. That is, the aperture ratio of the first pixel 21 is smaller than the aperture ratio of the second pixel 22. By adjusting the positions of the extending portions 310 of the light shielding layer 300, the first pixels 21 with lower aperture ratio and occupying a certain percentage can be uniformly distributed on the display unit.

As indicated in the display panel 1 of FIG. 2A, the light shielding layer 300 comprises a plurality of connecting portions 320. The connecting portions 320 connect the extending portions 310 and shield the traces such as scan lines or data lines of the display panel 1 to achieve light shielding effect. Each connecting portion 320 is disposed between any adjacent two of the sub-pixels R, G and B and connects the extending portions 310. The width of each connecting portion 320 on the Y-axis direction is smaller than that in the Y-axis direction.

Figure 3:
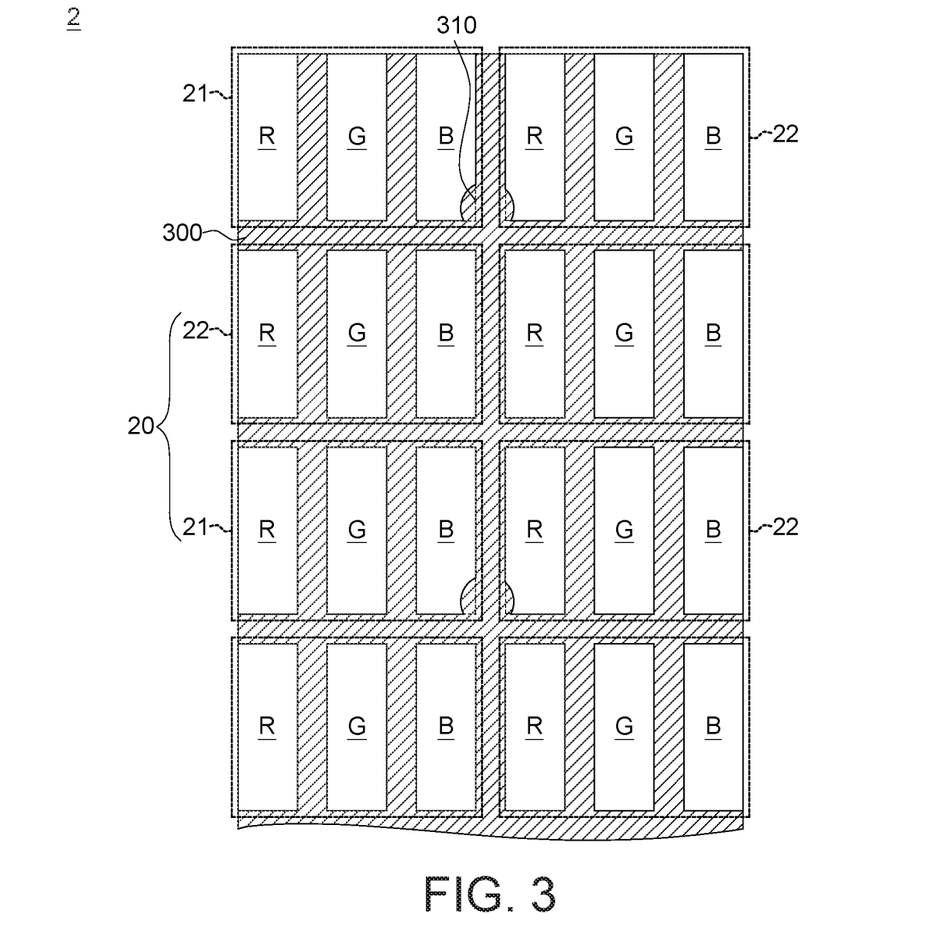
FIG. 3 is a planar diagram of a display panel according to another embodiment of the invention.

As indicated in the display panel 1 of FIG. 2A, the light shielding layer 300 further comprises a plurality of sub-extending portions 330. Like the extending portions 310, the sub-extending portions 330 are disposed at the junctions between the sub-pixels R, G and B. Each connecting portion 320 connects two adjacent sub-extending portions 330, or connects one adjacent extending portion 310 and one adjacent sub-extending portion 330. In the Y-axis direction, the width of the sub-extending portion 330 is greater than the width of the connecting portion 320 but is smaller than the width of the extending portion 310. The projection of each sub-extending portion 330 on the first substrate 100 also shields adjacent sub-pixels R, G and B, but the overlapping area is smaller than the projection of each extending portion 310 on the first substrate 100. Thus, the pixels overlapped by the projection of each the sub-extending portion 330 are still defined as second pixels. In some embodiments, the light shielding layer 300 of the display panel can be dispensed with the sub-extending portions 330 and can comprise single-sized extending portions 310 and connecting portions 320 instead as indicated in FIG. 3.

As indicated in FIG. 2B, the display panel 1 further comprises a filter layer 400 and a spacer 500. The filter layer 400 is located between the first substrate 100 and the second substrate 200 and can be disposed on one of the first substrate 100 and the second substrate 200. In the present example, the filter layer 400 is exemplarily disposed on the second substrate 200. The filter layer, such as a photo-resist, can make the sub-pixels R, G and B display three different colors. The position of the filter layer 400 corresponds to the sub-pixels R, G and B of FIG. 2A. The spacer 500 is located between the first substrate 100 and the second substrate 200, and can be disposed on the first substrate 100 or the second substrate 200. In the present example, the spacer 500 is exemplarily disposed on the second substrate 200. The spacer 500 fixes the interval between the first substrate 100 and the second substrate 200. To avoid the frame being affected by the spacer 500, the position of the spacer 500 corresponds to the extending portion 310 or the sub-extending portion 330 of the light shielding layer 300. In other words, the spacer 500 overlaps the projection of the extending portion 310 or the sub-extending portion 330 on the first substrate 100.

As indicated in FIG. 2B, each spacer 500 comprises a main spacer 510 and an auxiliary spacer 520. The top side 511 of the main spacer 510 leans on the opposite substrate (the first substrate 100), but the top side 521 of the auxiliary spacer 520 is separated from the opposite first substrate 100 by a distance. The main spacer 510, which leans on the opposite substrate, is used as a main supporter between two substrates and may easily generate friction with the opposite substrate and cause scratches. Therefore, the main spacer 510 must be disposed at a position corresponding to the extending portion 310 and overlaps the extending portion 310 of the light shielding layer 300 in the normal direction of the first substrate 100 (the Z-axis). The extending portion 310 is larger than the main spacer 510, and can thus resolve the aesthetic problem caused by the main spacer 510. Relatively, the auxiliary spacer 520 is disposed at a position corresponding to the extending portion 310 (such as the second auxiliary spacer 520 counted from the right-hand side of FIG. 2B) or disposed at a position corresponding to the sub-extending portion 330 (other auxiliary spacers 520 of FIG. 2B), such that the auxiliary spacer 520 overlaps the sub-extending portion 330 in the normal direction of the first substrate 100 (the Z-axis).

It should be noted that the position of the main spacer 510 must correspond to the extending portion 310. However, not each extending portion 310 has a main spacer 510 corresponding thereto, That is, the auxiliary spacer 520 can also be disposed under the extending portion 310.

In the embodiment indicated in FIG. 2, the main spacer 510 is different form the auxiliary spacer 520 mainly in length. In some embodiments, the main spacer 510 can be different from the auxiliary spacer 520 mainly in width. For example, the width of the main spacer 510 is greater than the width of the auxiliary spacer 520. The present invention does not have specific restrictions on the spacer.

FIG. 3 is a planar diagram of a display panel according to another embodiment of the invention. The display panel 2 of FIG. 3 is different from the display panel 1 of FIG. 1 mainly in the position of the extending portion 310 of the light shielding layer 300. As indicated in FIG. 3, each pixel 20 comprises three sub-pixels R, G and B, and one extending portion 310 only shields two pixels 20. The overlapping area between the pixel 20 located at the left half of the extending portion 310 and the projection of the extending portion 310 is greater than the overlapping area between the pixel 20 located at the right half of the extending portion 310 and the projection of the extending portion 310. Therefore, each pixel 20 located at the left half of the extending portion 310 has lower aperture ratio and is defined as a first pixel 21. Each pixel 20 located at the right half of the extending portions 320 (should be 310) but not shielded by the extending portion has larger aperture ratio and is defined as a second pixel 22.

Figure 4:
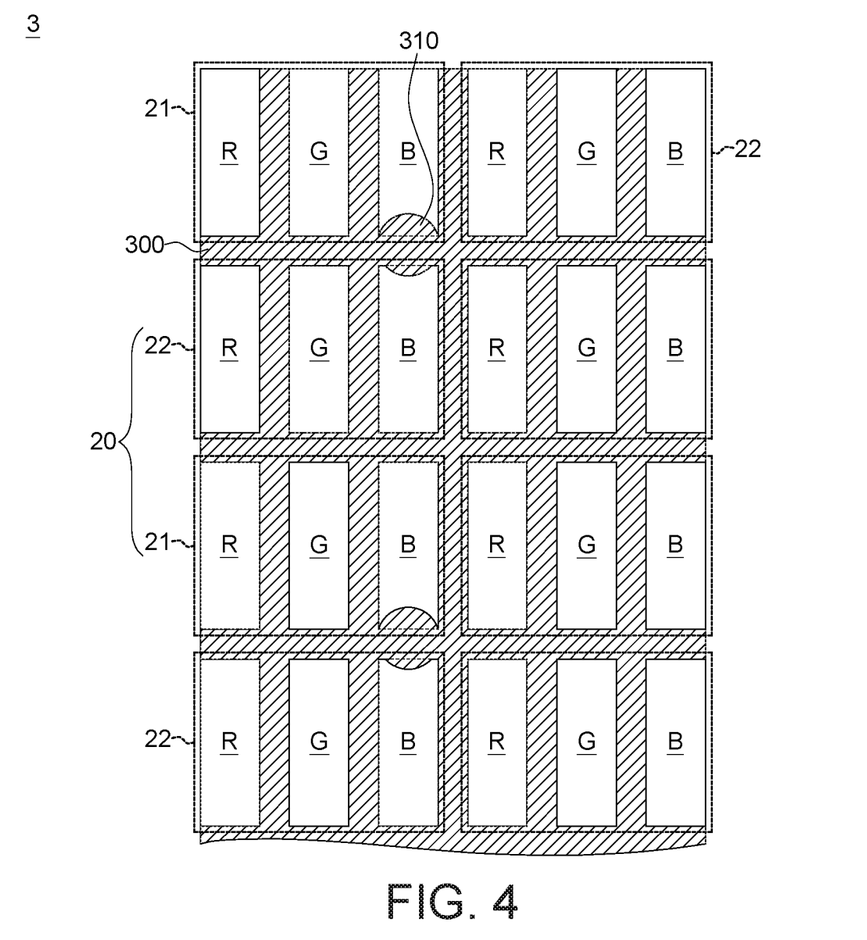
FIG. 4 is a planar diagram of a display panel according to an alternate embodiment of the invention another.

FIG. 4 is a planar diagram of a display panel according to another alternate embodiment of the invention. The display panel 3 is different from the display panel 1 of FIG. 1 mainly in the position of the extending portion 310 of the light shielding layer 300. As indicated in FIG. 4, one extending portion 310 only shields two pixels 20. The overlapping area between the pixel 20 located at the upper half of the extending portion 310 and the projection of the extending portion 310 is greater than the overlapping area between the pixel 20 located at the lower half of the extending portion 310 and the projection of the extending portion 310. Therefore, each pixel 20 located at the upper half of the extending portion 310 has lower aperture ratio and is defined as a first pixel 21, and each pixel 20 located at the lower half of the extending portion 310 but not shielded by the extending portion 310 has larger aperture ratio and is defined as a second pixel 22.

In some embodiments, it is possible that the projection of one extending portion 310 is entirely projected on one pixel 20. Under such circumstance, each pixel overlapping the projection of the extending portion on the first substrate is defined as a first pixel, and each pixel not overlapping with the projection of the extending portion on the first substrate is defined as a second pixel.

In above embodiments, the shape of the extending portion 310 or the sub-extending portion 330 of the light shielding layer 300 is exemplified by a circular shape. In some embodiments, the extending portion 310 or the sub-extending portion 330 of the light shielding layer 300 can be an ellipse, a rectangle, a parallelogram or other shape. The extending portion 310 and the sub-extending portion 330 of the present invention can have any shapes as long as the area is larger than each adjacent connecting portion and capable of shielding adjacent pixels.

In above embodiments, each pixel comprises three sub-pixels R, G and B. In some embodiments, each pixel may comprise four sub-pixels (such as RGBW) or more than four sub-pixels. The present invention does not have specific restrictions on the number of sub-pixels.

Figure 5:
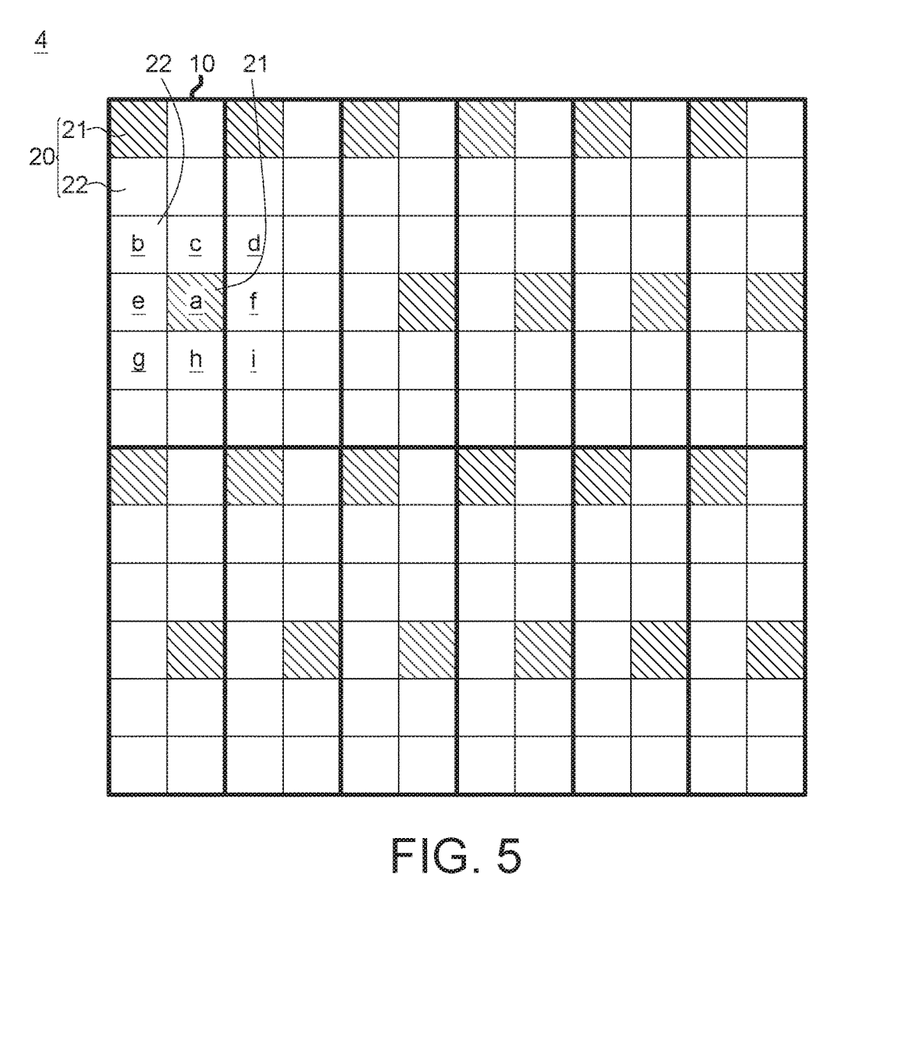
FIG. 5 is a planar diagram of a display panel according to an embodiment of the invention.

Principles regarding the distribution of the extending portions 310 of the light shielding layer 300 of the present invention are explained with FIG. 5, a planar diagram of a plurality of display units 10 of FIG. 1. Each display unit 10 comprises 12 pixels 20 arranged in a 6*2 matrix (6 rows, 2 columns). A plurality of display units 10 are arranged in a repetitive manner to form an image display region of the display panel 4. In FIG. 5, each pixel 20 is simplified and denoted by a square. The squared pixels 20 are further divided into first pixels 21 (denoted by slashed squares) and second pixels 22 (denoted by blank squares) according to the size of the area shielded by the extending portion 310 or the sub-extending portion 320 (FIG. 1) of the light shielding layer 300.

In each display unit 10 of FIG. 1 and FIGS. 2A and 2B, there is at most one first pixel 21 per column and per row. In each display unit 10, all of the pixels 20 adjacent to the first pixel 21 are second pixels 22. As indicated in FIG. 5, two adjacent pixels 20 refer to two pixels 20 adjacent to each other by edge or corner. For example, the first pixel 21 designated by "a" has eight adjacent pixels 20 designated by "b", "c", "d", "e", "f", "g", "h" and "i." All of the eight pixels 20 are second pixels 22. The first pixels 21 corresponding to a larger area of the light shielding layer are interlaced with the second pixels 22 corresponding to a smaller area of the light shielding layer. Since such pattern cannot be easily detected with human eyes, the viewer will not perceive any image strips.

As indicated in FIG. 5, the display unit 10 comprises 6*2 pixels 20 arranged in a 6*2 matrix, m=6, n=2. Each display unit 10 at most has two first pixels 21. It is possible that each display unit 10 has only one first pixel 21.

Figure 6:
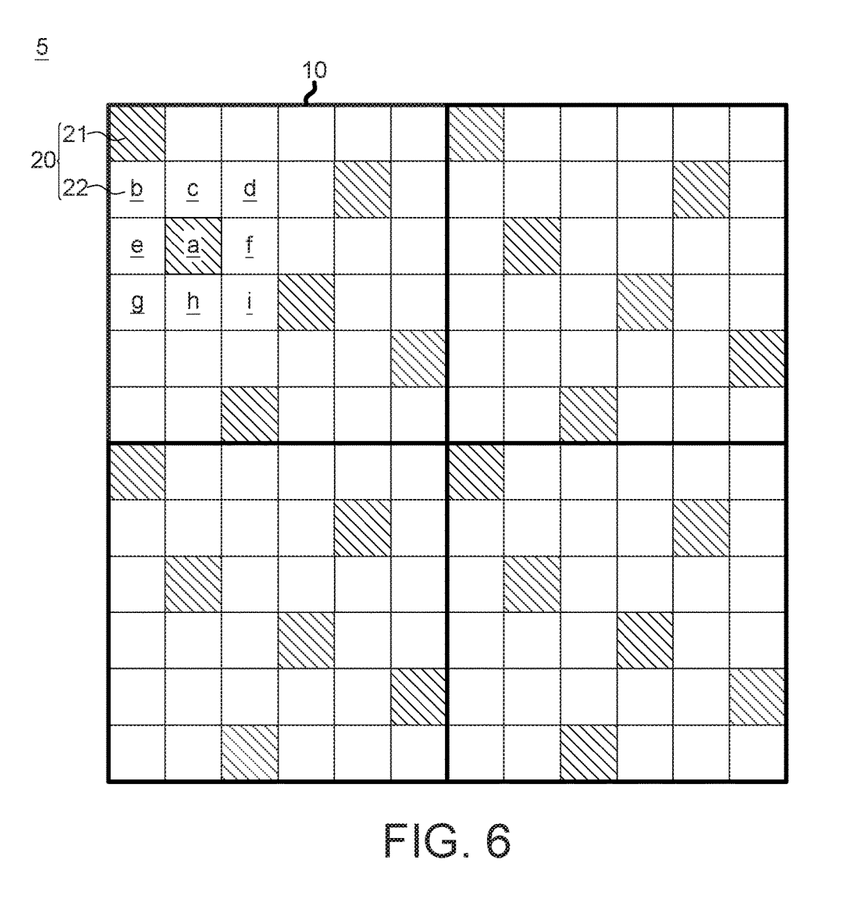
FIG. 6 is a planar diagram of a display panel according to another embodiment of the invention.

Referring to FIG. 6, a planar diagram of a display panel according to another embodiment of the invention is shown. In the display panel 5, each display unit 10 comprises 36 pixels 20 arranged in a 6*6 matrix (6 rows, 6 columns), wherein m=n=6. In the entire image display region, each pixel 20 adjacent to the first pixel 21 is a second pixel 22. In each display unit 10, there is one first pixel 21 per column and per row. For example, the first pixel 21 designated by "a" has eight pixels 20 designated by "b", "c", "d", "e", "f", "g", "h" and "i" adjacent thereto, and all of the eight pixels 20 are second pixels 22 with higher aperture ratio.

Figure 7:
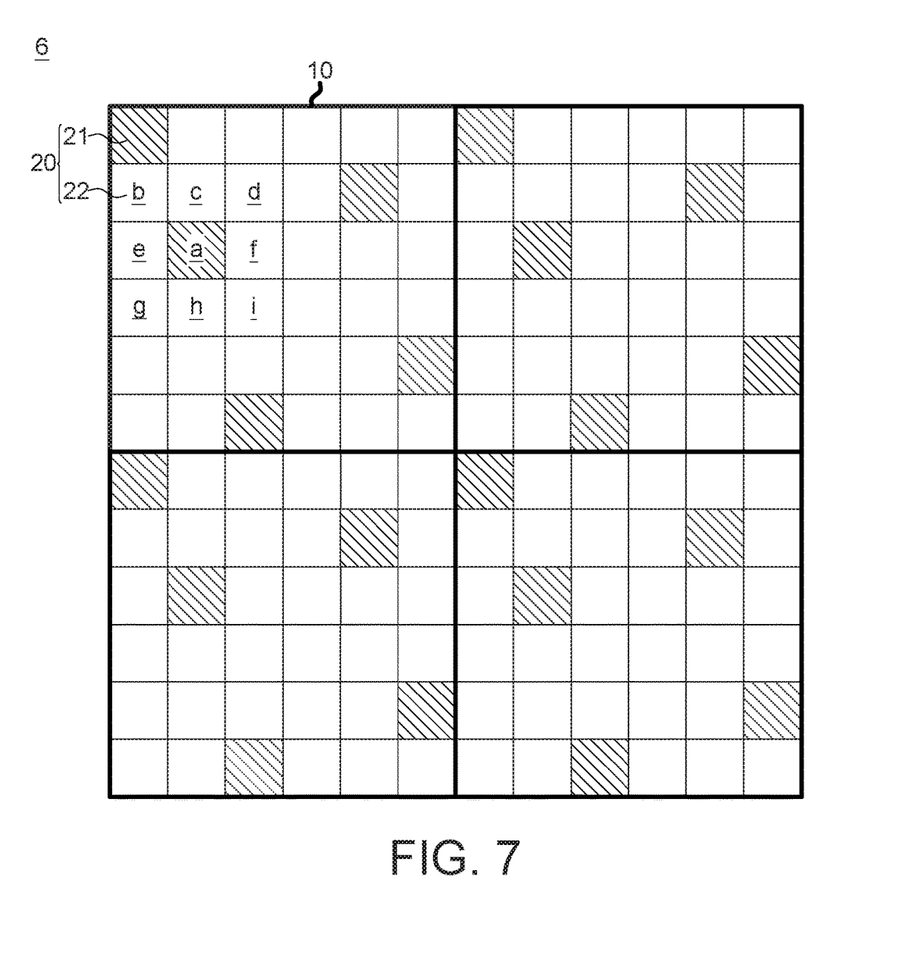
FIG. 7 is a planar diagram of a display panel according to an alternate embodiment of the invention.

Referring to FIG. 7, a planar diagram of a display panel according to an alternate embodiment of the invention is shown. The display panel 6 of FIG. 7 is different from the display panel 5 of FIG. 6 mainly in that each display unit 10 of the display panel 6 does not necessarily have one first pixel 21 per column and per row. As disclosed above, the position of the first pixel 21 can be changed by adjusting the extending portion 310 of the light shielding layer 300 (FIG. 2A). In the present embodiment, after the display units 10 are arranged in a repetitive manner, in the image display region, there will be one entire column or entire row whose pixels are merely second pixels 22, and image strips generated due to the arrangement of the first pixel 21 can thus be improved. For example, there is no first pixel 21 in the $4^{th}$ and the $10^{th}$ rows (counted from the top) of the image display region of the display panel 6 of FIG. 7.

Figure 8:
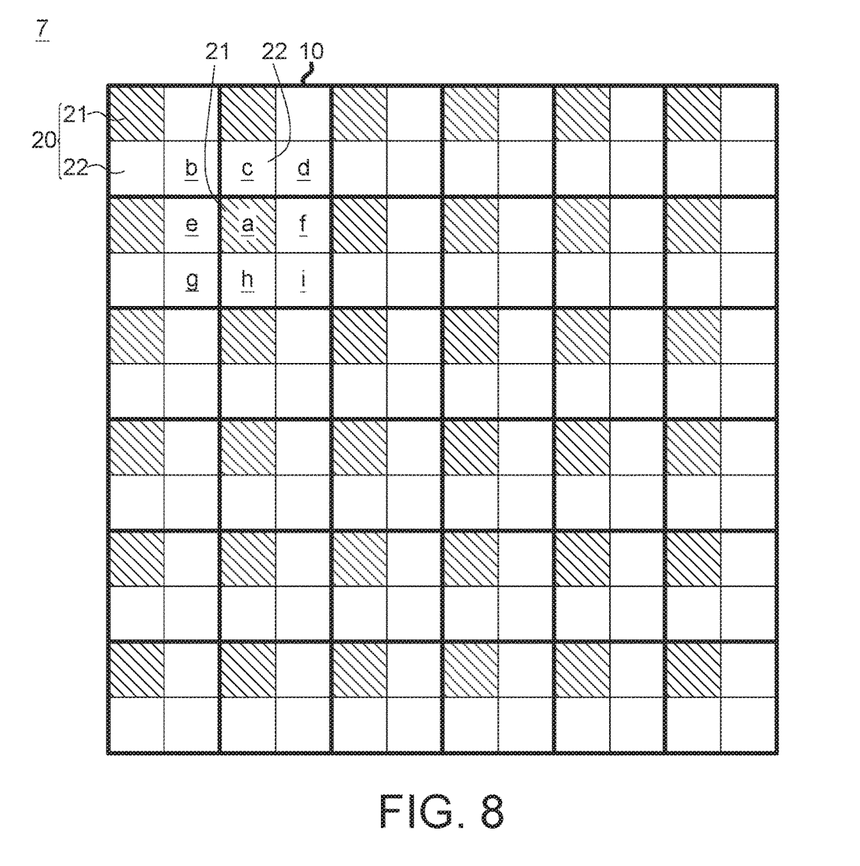
FIG. 8 is a planar diagram of a display panel according to another alternate embodiment of the invention.

Referring to FIG. 8, a planar diagram of a display panel according to of the invention another alternate embodiment is shown. In the display panel 7, each display unit 10 comprises four pixels 20 arranged in a 2*2 matrix (2 rows, 2 columns). Each display unit 10 has one first pixel 21. In the entire image display region, each pixel 20 adjacent to the first pixel 21 is a second pixel 22. For example, the first pixel 21 designated by "a" has eight pixels 20 designated by "b", "c", "d", "e", "f", "g", "h" and "i" adjacent thereto, and all of the eight pixels 20 are second pixels 22. In the present embodiment, the first pixels 21 are distributed with high density, and are capable of effectively reducing the viewers' perception image strips even in a high PPI product.

It should be noted that pixel arrangement of the display panel of the present invention is not limited to the above exemplifications. Any arrangements will do as long as the following criteria are satisfied: (1) In a display unit, there is at most one pixel with lower aperture ratio (the first pixel) per column and per row. (2) In the entire display panel, each pixel with lower aperture ratio (the first pixel) is surrounded by pixels with higher aperture ratio (the second pixels). Through such arrangement, the viewers' perception of image strips can be reduced without reducing the overall aperture ratio of the display panel.

Through specific arrangement of the light shielding layer and pixels disclosed above, the present invention is capable of maintaining the aperture ratio of the display panel, avoiding the perception of image strips, and improving display quality.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, comprising:
a first substrate;
a second substrate opposite to the first substrate; and
a light shielding layer located between the first substrate and the second substrate,
wherein the light shielding layer comprises a plurality of first connecting portions extending along a first direction, a plurality of second connecting portions extending along a second direction, a plurality of extending portions and a plurality of sub-extending portions, wherein the extending portions and the sub-extending portions are connected by the first and second connecting portions, and the first direction is different from the second direction,
wherein the first connecting portions and the second connecting portions extend and intersect to define a plurality of sub-pixels, and the sub-pixels include a first sub-pixel,
wherein a projection of the extending portions on the first substrate overlaps the first sub-pixel to form a first overlapping area, a projection of the sub-extending portions on the first substrate overlaps the first sub-pixel to form a second overlapping area, and the first overlapping area is greater than the second overlapping area, and
wherein a largest width of the extending portions is greater than a largest width of the sub-extending portions in the first direction, and a width of the extending portions is greater than a width of the first connecting portions in the second direction.

2. The display panel according to claim 1, wherein a width of the first overlapping area is greater than a width of the second overlapping area in the first direction.

3. The display panel according to claim 1, further comprising a plurality of spacers, wherein one of the spacers overlaps one of the extending portions.

4. The display panel according to claim 3, wherein the spacers are disposed between the first substrate and the second substrate.

5. The display panel according to claim 1, further comprising a plurality of spacers, wherein one of the spacers overlaps one of the sub-extending portions.

6. The display panel according to claim 1, further comprising a plurality of main spacers and a plurality of auxiliary spacers disposed between the first substrate and the second substrate, wherein a width of the main spacers is larger than a width of the auxiliary spacers in second direction.

7. The display panel according to claim 1, wherein a largest width of the extending portions is greater than a largest width of the sub-extending portions in the second direction.

8. The display panel according to claim 1, wherein a width of the first overlapping area is greater than a width of the second overlapping area in the second direction.

9. A display panel, comprising:
a first substrate;
a second substrate opposite to the first substrate; and
a light shielding layer located between the first substrate and the second substrate,
wherein the light shielding layer comprises a plurality of first connecting portions extending along a first direction, a plurality of second connecting portions extending along a second direction, a plurality of extending portions and a plurality of sub-extending portions, wherein the extending portions and the sub-extending portions are connected by the first and second connecting portions, and the first direction is different from the second direction,
wherein the first connecting portions and the second connecting portions extend and intersect to define a plurality of sub-pixels, and the sub-pixels include a first sub-pixel,
wherein a projection of the extending portions on the first substrate overlaps the first sub-pixel to form a first overlapping area, a projection of the sub-extending portions on the first substrate overlaps the first sub-pixel to form a second overlapping area, and the first overlapping area is greater than the second overlapping area, and
wherein a largest width of the extending portions is greater than a largest width of the sub-extending portions in the first direction, wherein adjacent two of the sub-extending portions are on opposing sides of one of the extending portions.

10. The display panel according to claim 9, wherein there is no another of the extending portions disposed among the one of the extending portions and the adjacent two of the sub-extending portions.

11. The display panel according to claim 1, wherein adjacent four of the sub-extending portions are disposed on different four sides of one of the extending portions.

12. The display panel according to claim 1, wherein a width of the sub-extending portions is greater than a width of the first connecting portions in the second direction.

13. The display panel according to claim 1, wherein one of the extending portions is surrounded by adjacent eight of the sub-extending portions.

14. The display panel according to claim 1, wherein the sub-pixels further comprise a second sub-pixel adjacent to the first sub-pixel, and the projection of the sub-extending portions on the first substrate overlaps the second sub-pixel.

15. The display panel according to claim 1, wherein a projection of one of the extending portions on the first substrate overlaps adjacent four of the sub-pixels.

16. The display panel according to claim 1, wherein a projection of one of the sub-extending portions on the first substrate overlaps adjacent four of the sub-pixels.

17. The display panel according to claim 1, wherein a width of the second connecting portions is smaller than the largest width of the extending portions and the largest width of the sub-extending portions in the first direction.

* * * * *